Figure 1:
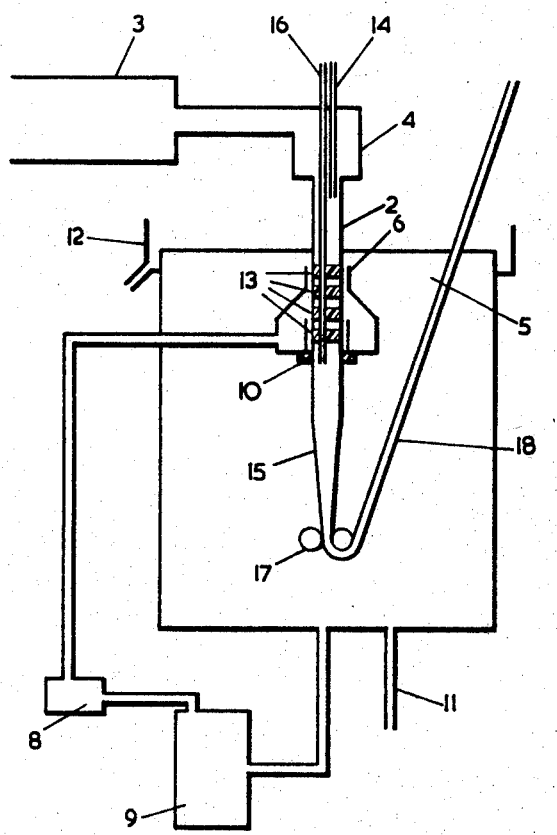

May 28, 1968  J. JACK ETAL  3,385,918
EXTRUSION PROCESS AND APPARATUS FOR ISOTACTIC POLYPROPYLENE
Filed March 23, 1966  2 Sheets-Sheet 1

James Jack and
Godfrey Austin King,
INVENTORS

BY Wenderoth, Lind
and Ponack, ATTORNEYS 3,385,918
EXTRUSION PROCESS AND APPARATUS FOR
ISOTACTIC POLYPROPYLENE
James Jack, Mistley, and Godfrey Austin King, Manningtree, England, assignors to B. X. Plastics Limited, London, England, a British company
Continuation-in-part of abandoned application Ser. No. 326,959, Nov. 29, 1963. This application Mar. 23, 1966, Ser. No. 543,460
Claims priority, application Great Britain, Dec. 1, 1962, 45,575/62, 45,576/62; Mar. 26, 1965, 12,841/65
9 Claims. (Cl. 264—180)

This is a continuation-in-part of our application Ser. No. 326,959 filed Nov. 29, 1963 and now abandoned.

The present invention relates to a process for the production of tubes from isotactic polypropylene.

Various processes for the production of tubes from organic thermoplastic polymeric materials are known which involve a quenching process. For example a process for the production of a tube from thermoplastic materials having a high melting point and giving a very mobile melt, for example polyethylene terephthalate, has been proposed in which the tube is formed by extrusion and is then shaped by passing it while inflated through a passageway which, at least at the entrance end for the tubing, is of substantially circular cross-section and which is interiorly bathed by a downwardly flowing cooling liquid which contacts the whole of the external surface of the tubing or tubular film as it passes through the passageway. Since the tube is shaped by means of the passageway, the latter's diameter approximates to that of the formed tube and consequently there is a danger that the outer surface of the tube may become scratched during the quenching process with a result that the appearance of the tube is spoilt. This defect is particularly serious when using isotactic polypropylene to form a tube which is to be used subsequently in the manufacture of biaxially oriented film by the "bubble blowing" process, i.e. the process in which the heated tube is blown up and stretched at the same time so that it is formed into a tubular film which has been biaxially oriented.

A further difficulty which is encountered in the formation of tubing from isotactic polypropylene is that its induction period for crystallisation is very short compared with that for polyethylene terephthalate and consequently it cannot be quenched like polyethylene terephthalate after leaving the extruder to an amorphous form. Consequently higher air pressures or more formers are needed to prevent the collapse of the extruded tube in the case of isotactic polypropylene than in the case of polyethylene terephthalate.

An object of the present invention is to provide a process for the production of tubes from isotactic polypropylene having good inner and outer surfaces.

Accordingly the present invention is a process for the production of a quenched tube of isotactic polypropylene which comprises extruding a tube of the polypropylene downwardly over a former comprising at least two separated discs lying at right angles to the axis of the tube and having a shape identical to the desired cross-section of the quenched tube, said former being within a tubular sleeve situated below the surface of a quenching liquid, and drawing the quenching liquid downwardly through said sleeve at such a rate that quenching of the tube occurs within the sleeve, the width and shape of the sleeve relative to those of the tube and the distance of the sleeve below the surface of the quenching liquid being adjusted to give a quenched tube having the desired crystallite form and to prevent boiling of the quenching liquid.

Most suitably the tube formed by the process of the present invention has a circular cross-section, but tubes with other cross-sections, for instance oval cross-sections, can be formed. In order to produce tubes having the crystallite structure necessary for giving tough transparent films by subsequent biaxial stretching at elevated temperatures, it is preferred that the cross-section area of the sleeve shall be of the same shape as that of the tube to be formed, and thus, if the tube is located centrally within the sleeve, the same volume of quenching liquid is present all round the tube. The tubes are most generally formed having a circular cross-section and the present invention is described in terms of such tubes. It must however be appreciated that this invention can readily be adapted to the production of tubes of different cross-sectional shapes.

Any standard extrusion apparatus can be used in the process of the present invention. The diameter of the molten tube directly on extrusion can differ substantially from the diameter of the finally formed tube after quenching. In some cases, it is advantageous to have the diameter of the quenched tube slightly smaller than that of the extruded tube.

Although it is necessary to arrange a former having at least two discs within the tubular sleeve, additional discs can be present to aid the shaping of the tube. For example it may be desirable to have an additional shaping disc above the level of the quenching liquid. Such a disc is particularly useful if the space in the extruding tube between the extruder and the former is vented to the atmosphere.

The molten, extruded tube travels over the former which thus controls the inner shape of the tube. The former comprising at least two discs is located within the tubular sleeve so that the shape of the tube is not altered disadvantageously during the quenching. The distance between the first and last discs forming the former is thus arranged so that adequate quenching takes place between the two. The number of discs constituting the former can be varied widely, but it is generally preferred to use a few as is consistent with adequate support of the tube during quenching. Generally at least three discs are employed. It is also preferred that each disc shall be as thin as is consistent with adequate support of the molten tube and thus the area of the discs in contact with the tube is kept as small as possible. Similarly the contact area can be kept small by bevelling the edges of the discs.

The edges of the disc forming the former which are in contact with the tube are made of a material having a sufficiently low coefficient of friction in contact with the tube that there is no difficulty in causing the tube to extrude over the former. Polytetrafluoroethylene is a useful material for this purpose because it has a low coefficient of friction in contact with isotactic polypropylene.

Although the discs are separated at their points of contact with the tube in order to reduce the area of former in contact with the tube, it will be appreciated that they may be joined in their central portions. For instance, bobbin like formers can be machined from a suitable block of material.

The discs forming the former and any additional shaping disc can suitably be mounted on a rod, which may be hollow, running along the axis of the extruding tube. This rod can be attached to and located by the extruder head. It is often desirable to control the gas pressure within the tube before it passes onto the former and after it leaves the former. This can be done by arranging that the former discs create a gas tight seal within the tube and that the rod holding the former discs has two separate passageways communicating separately with the parts of the tube where it is desired to control the gas pressure. The gas pressure in the space between any two discs within the former can also be regulated in this way if the space is in communication with a suitable source of pressure. It is also possible to regulate the air pressure within the extruding tube by supplying air to the tube below the former and arranging holes in the discs of the former so that air can pass through and supply the necessary air pressure within the extruding tube at all points.

The tubular sleeve has an internal diameter greater than the external diameter of the forming tube and thus an annular passage through which the quenching liquid can be downwardly drawn is formed. The size of this annular passage is so arranged that substantially all of the cooling necessary to quench the tube comes from the quenching liquid drawn through this passage. When the only means by which the quenching liquid can enter the sleeve is through the top thereof, the distance of the top of the sleeve below the surface of the quenching liquid is arranged so that sufficient liquid can pass into the annular passage. It is, however, important that the top of the sleeve is not so far below the surface of the quenching fluid that the rate of flow of liquid is so reduced at the point of tube entry that boiling of the liquid occurs. Such boiling has a deleterious effect on the outer surface of the formed tube.

To improve the rate at which satisfactory quenching can be achieved, means for supplying quenching liquid to the sleeve additional to the open upper end thereof can be provided. Suitably this can be done by providing the tubular sleeve with substantially annular openings at either end thereof through which quenching liquid can be drawn. In order to reduce the tendency for quenching liquid to be drawn upwardly into the sleeve, the bottom end thereof preferably contains a ring of sealing material which can form a seal with the extruding tube. If the amount of quenching liquid supplied to the upper opening in the sleeve is less than the quantity withdrawn from the lower opening, additional quenching fluid will flow into the sleeve through the open upper end thereof. In a preferred embodiment of the present invention the quenching fluid withdrawn from the bottom of the sleeve is circulated by a suction pump and is cooled and is then returned to an upper opening in the sleeve thus forming a substantially closed circuit. In this way there is little flow of quenching liquid into the upper end of the sleeve. By adjusting the diameter of the sleeve, the cooling of the quenching liquid and the rate of flow through the suction pump, the desired degree of quenching can be obtained. Suitably when operating in this way, the quenching liquid in the sleeve has a temperature variation in the range 1° C. to 20° C. The temperature of the quenching liquid in the bath is less important, suitably it can be at room temperature.

The distance of the sleeve below the surface of the quenching liquid must not be so great as to allow the extruded tube to cause the liquid to boil. The degree of cooling to which the tube is subjected is controlled by control of the flow of quenching liquid through the sleeve. When the quenching liquid is fed to the sleeve through an annular opening therein the precise depth of the sleeve below the surface of the quenching liquid is less critical than in the case where all the quenching liquid enters the sleeve through its open upper end.

The quenching liquid is most suitably water and is preferably drawn down the annular space between the forming tube and the outer sleeve by means of a suction pump. The temperature of the liquid, when water, can lie between 0° and 90° C. depending upon the desired properties of the quenched tube and the dimensions of the sleeve. Preferably the temperature of the quenching fluid in the sleeve is maintained in the range 1° C. to 20° C.

The expression "quenching" is used throughout the specification to describe the rapid cooling of at least part of a hot thermoplastic article so as to set its molecular structure in a desirable way. It is believed that a particular advantage of the process of the present invention is that it enables a rapid cooling (at least 60° C. per second) of the outer surface of the extruding tube to take place in order to bring the temperature of this outer surface below 110° C. It is thought that the very rapid cooling of the outer surface of the extruding tube, which the process and apparatus of the present invention can provide, brings the temperature of the outer skin of the tube through the range 140–110° C. at a very high rate with the result that the resultant tubes are particularly useful for the production of film by a bubble blowing technique.

The accompanying drawings illustrate embodiments of the process according to the present invention. Both FIGURES 1 and 2 show diagrammatic vertical cross-sections of apparatuses for the production of flattened tube according to the present invention.

In FIGURE 1 a tube 2 is extruded in a downward direction from an extruder 3 having a head 4 into a quenching bath 5. The tube passes through a sleeve 6, the top of which is below the surface of the quenching water. A flow of water is maintained down the annular passage 7 between the sleeve and the tube by means of a suction pump 8. This pump passes the quenching water through a cooler 9 and then back to the quenching tank. The entry of quenching water at the bottom of the sleeve is prevented by a foam seal 10. In the extrusion of a linear polypropylene pipe the quenching water is cooled so that the temperature within the quenching tank is about 10° C. Additional water is supplied through pipe 11 to maintain the desired level in the tank by means of overflow to a drain 12.

The extruded film passes from the extruder over a former which consists of four circular discs 13 made from polytetrafluoroethylene having an external diameter approximately equal to that of the internal diameter of the die orifice. The discs are so positioned that they prevent any deformation of the tube before it is finally quenched, and are made so that they form a seal in the extruding tube. In this way air pressure through pipe 14 prevents collapse of the unquenched tube and a different air pressure is fed into the quenched tube 15 by pipe 16, so as to prevent premature collapse of the quenched tube before the controlled collapse caused by rollers 17. The rolled flat, quenched tube 18 is led from the quenching bath and can be formed into biaxially oriented film by any of the usual "bubble blowing" techniques.

Figure 2:
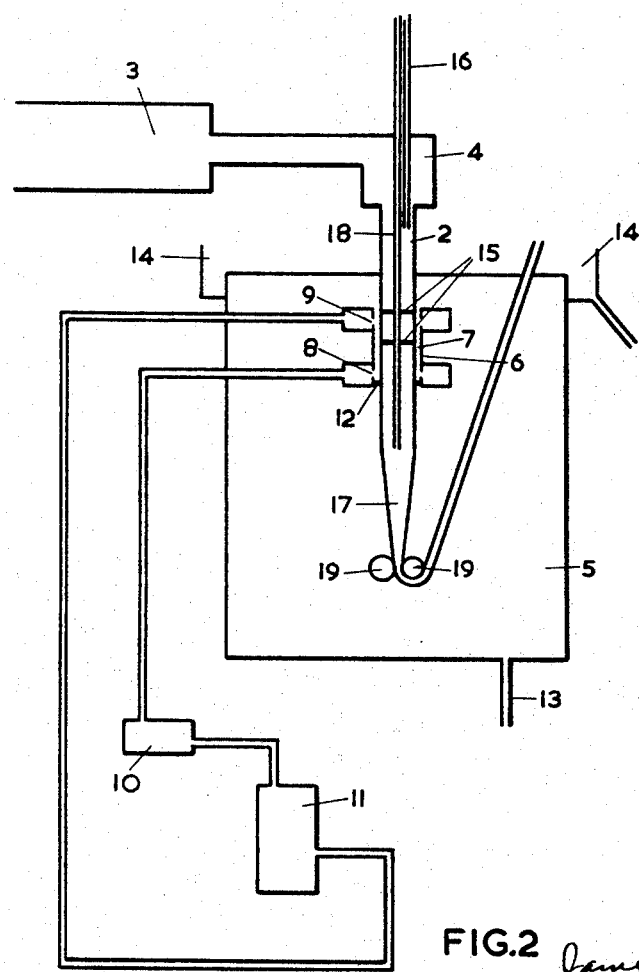

In FIGURE 2 a tube 2 is extruded in a downward direction from an extruder 3 having a head 4 into a quenching bath 5. The tube passes through the tubular sleeve 6, the top of which is below the surface of the quenching water. A flow of water is maintained down the annular passage 7 between the sleeve and the tube by means of a suction pump 10. This pump passes the quenching water through a cooler 11 and then back to the top of the sleeve. The openings 8 and 9 through which fluid is drawn from and fed to the sleeve are substantially annular and thus supply an even flow of water to the annular passage 7. Any possibility of quenching water entering at the bottom of the sleeve is prevented by a foam seal 12. In the extrusion of a linear polypropylene pipe the quenching water is cooled so that its temperature within the quenching tank is about 10° C. Additional water is supplied through pipe 13 to maintain the desired level in the tank by means of overflow to a drain 14. Suitably this can be uncooled mains water.

The extruded film passes from the extruder over a former which consists of two circular discs 15 made from polytetrafluoroethylene having an external diameter approximately equal to that of the internal diameter of the die orifice. The discs are so positioned that they prevent any deformation of the tube before it is finally quenched, and are made so that they form a seal in the extruding tube. In this way air pressure through pipe 16 prevents collapse of the unquenched tube and a different air pressure is fed into the quenched tube 17 by pipe 18, so as to prevent premature collapse of the quenched tube before the controlled collapse caused by rollers 19. The rolled flat, quenched tube 20 is led from the quenching bath and can be formed into biaxially oriented film by any of the usual "bubble blowing" techniques.

Alternatively in the processes described with reference to both FIGURES 1 and 2 the quenched tubes can be led from the quenching baths through suitable gaskets in the bases thereof. They can then be collapsed in air beneath the bath by means of suitable rollers.

The apparatuses described above can be used advantageously to form tubes having an internal diameter of less than 2½ inches. If it is desired to produce a larger tube, the apparatus of FIGURE 2 is best used with a shaping disc, additional to those forming the former, placed between the extruder and the former. For example, in order to extrude high quality polypropylene tubing having an internal diameter of approximately 4 inches using the apparatus described in FIGURE 2, the two disc former may be replaced by a four disc former within the tubular sleeve and an additional shaping disc above the level of the water in the bath. Details of such extrusion are.

| | | |
|---|---|---|
| Die diameter | inches | 4½ |
| Distance of additional disc from die | do | 6 |
| Approximate diameter of discs | do | 4 |
| Thickness of discs | do | 0.25 |
| Spacing of discs in the former | do | 0.25 |
| Distance between top former disc and additional disc | inches | 0.5 |
| Output | lbs. per hr | 130 |
| Haul off speed | f.p.m | 14 |
| Tube thickness | inch | 0.026 |
| Temperature range of water in sleeve | ° C | 10–12 |

The top of the tubular sleeve is level with the top of the top former disc and the bottom with the bottom of the bottom former disc. The water level of the bath is maintained 0.25 inch above the top of the first former disc and thus the additional shaping disc is above the level of the water. The diameters of the discs of the former can be made to increase from the top to the bottom to allow for the fact that owing to the progressive cooling of the tube as it passes over the former, the top disc will be hotter than the bottom disc. For the same reason the additional shaping disc has a smaller diameter than the former discs. In the apparatus discussed above suitable disc diameters are:

| | Inches |
|---|---|
| Additional shaping disc | 4 |
| Top disc | 4.125 |
| 2nd disc | 4.135 |
| 3rd disc | 4.145 |
| Bottom disc | 4.155 |

This slight increase in the diameter of each disc ensures that a good seal is obtained between the edge of each disc and the tube. A small hole (1/32 inch) is present in the discs forming the former and a larger hole is present in the additional shaping disc.

The discs are assembled on a central pipe which feeds sufficient air pressure into the quenched tube to control its collapse by the rollers and to prevent premature collapse under the hydrostatic pressure of the quenching liquid. This air pressure is communicated through the holes in the former discs and thus ensures that the tube does not neck between any of the discs. The air space between the additional shaping disc and the die is vented. It should be noted that in this embodiment there is no need to maintain a controlled air pressure between the die and the additional disc because the extruding tube in this region is not subjected to hydrostatic pressure by quenching liquid.

We claim:
1. A process for the production of a quenched tube of isotactic polypropylene for conversion into biaxially oriented film which comprises extruding a solid unperforated tube of the polypropylene downwardly over a former comprising at least two separated discs lying at right angles to the axis of the tube and having a shape identical to the desired cross-section of the quenched tube and being below the surface of a bath of quenching liquid, while passing the tube through a tubular sleeve around the former and below the surface of the bath of quenching liquid and having the inner surface thereof spaced from the outer surface of the tube, and drawing quenching liquid downwardly through the space between said sleeve and said tube at such a rate that rapid quenching of the tube occurs within the sleeve and boiling of the quenching liquid in the bath and within the sleeve is avoided, the width and shape of the sleeve relative to those of the tube and the distance of the sleeve below the surface of the quenching liquid being such as to produce a quenched tube having the desired crystallite form.

2. A process as claimed in claim 1, in which the step of drawing the quenching liquid through the sleeve comprises withdrawing quenching liquid from the lower portion thereof and supplying quenching liquid to the upper portion thereof in addition to any quenching liquid entering the open upper end of the sleeve.

3. A process as claimed in claim 2, in which the step of withdrawing the quenching fluid from the bottom of the sleeve and returning it to the upper part of the sleeve comprises pumping it by a suction pump, cooling it, and then returning it directly to the upper portion of the sleeve.

4. A process as claimed in claim 1, wherein the quenching liquid is drawn through the sleeve at a rate to give to it a temperature variation in the range of from 1° C. to 20° C.

5. A process as claimed in claim 1, including the step of passing the extruded polypropylene tube over a shaping disc before passing it over the former.

6. Apparatus for the production of a quenching tube of isotactic polypropylene which comprises a downwardly operating extruder, a former comprising at least two separate discs located below the extruder orifice, a tubular sleeve surrounding the former, a bath containing means for maintaining a bath of quenching liquid around the extruded tube at a level above the tubular sleeve and means connected to the sleeve for drawing quenching liquid downwardly through the sleeve.

7. Apparatus as claimed in claim 6, in which said means for drawing the quenching liquid include means to supply quenching liquid to the upper portion of the sleeve just below to the open upper end thereof.

8. Apparatus as claimed in claim 6, further including a shaping disc is provided between the extruder and the former.

9. An apparatus as claimed in claim 6 in which the former comprises at least three discs.

References Cited
UNITED STATES PATENTS

| | | | |
|---|---|---|---|
| 2,814,071 | 11/1957 | Allen et al. | 264—180 |
| 3,022,543 | 2/1962 | Baird et al. | 264—209 |
| 3,090,998 | 5/1963 | Heisterkamp et al. | 264—98 |
| 3,222,440 | 12/1965 | Murphy | 264—210 X |

JAMES A. SEIDLECK, *Primary Examiner.*

J. H. WOO, *Assistant Examiner.*